United States Patent
Oshima

(10) Patent No.: US 9,128,004 B2
(45) Date of Patent: Sep. 8, 2015

(54) MEASUREMENT METHOD, MEASUREMENT APPARATUS, NON-TRANSITORY COMPUTER-READABLE STORAGE MEDIUM, AND OPTICAL ELEMENT FABRICATION METHOD

(75) Inventor: Yuki Oshima, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 543 days.

(21) Appl. No.: 13/550,740

(22) Filed: Jul. 17, 2012

(65) Prior Publication Data

US 2013/0024158 A1    Jan. 24, 2013

(30) Foreign Application Priority Data

Jul. 22, 2011    (JP) .................. 2011-161364

(51) Int. Cl.
*G01B 11/24* (2006.01)
*G01B 11/255* (2006.01)
*G06F 15/00* (2006.01)
*G01M 11/02* (2006.01)
*G01B 9/02* (2006.01)
*G01M 11/00* (2006.01)

(52) U.S. Cl.
CPC ......... *G01M 11/025* (2013.01); *G01B 9/02085* (2013.01); *G01B 11/2441* (2013.01); *G01M 11/005* (2013.01)

(58) Field of Classification Search
CPC .......... G01B 9/02085; G01B 11/2441; G01M 11/025; G01M 11/005
USPC .......... 702/17, 158, 150, 167; 356/401, 4.01; 359/399
See application file for complete search history.

(56) References Cited

U.S. PATENT DOCUMENTS

| | | | |
|---|---|---|---|
| 6,956,657 B2 * | 10/2005 | Golini et al. ................. 356/512 |
| 8,024,144 B2 * | 9/2011 | Kludas et al. ................. 702/85 |
| 8,447,561 B2 * | 5/2013 | Negishi ...................... 702/167 |
| 8,843,337 B2 * | 9/2014 | Yamazoe ..................... 702/85 |
| 2009/0138233 A1 * | 5/2009 | Kludas et al. ............... 702/158 |
| 2011/0119011 A1 * | 5/2011 | Yamazoe ..................... 702/85 |
| 2012/0089246 A1 * | 4/2012 | Mitani et al. ................ 700/159 |

* cited by examiner

*Primary Examiner* — Carol S Tsai
(74) *Attorney, Agent, or Firm* — Rossi, Kimms & McDowell LLP

(57) ABSTRACT

The present invention provides a method of measuring a shape of a target surface, including a step of obtaining shape data by causing a stage which holds the target surface to rotate the target surface about a rotation axis, positioning each of a plurality of partial regions of the target surface in a field of view of a measurement apparatus, and causing the measurement apparatus to measure each of the plurality of partial regions, a step of obtaining, for each of a plurality of partial contour regions, a central position of the target surface using data of a contour included in the shape data, and a step of obtaining, based on the obtained plurality of central positions, a position of the rotation axis of the target surface in positioning each of the plurality of partial regions.

9 Claims, 12 Drawing Sheets

F I G. 1
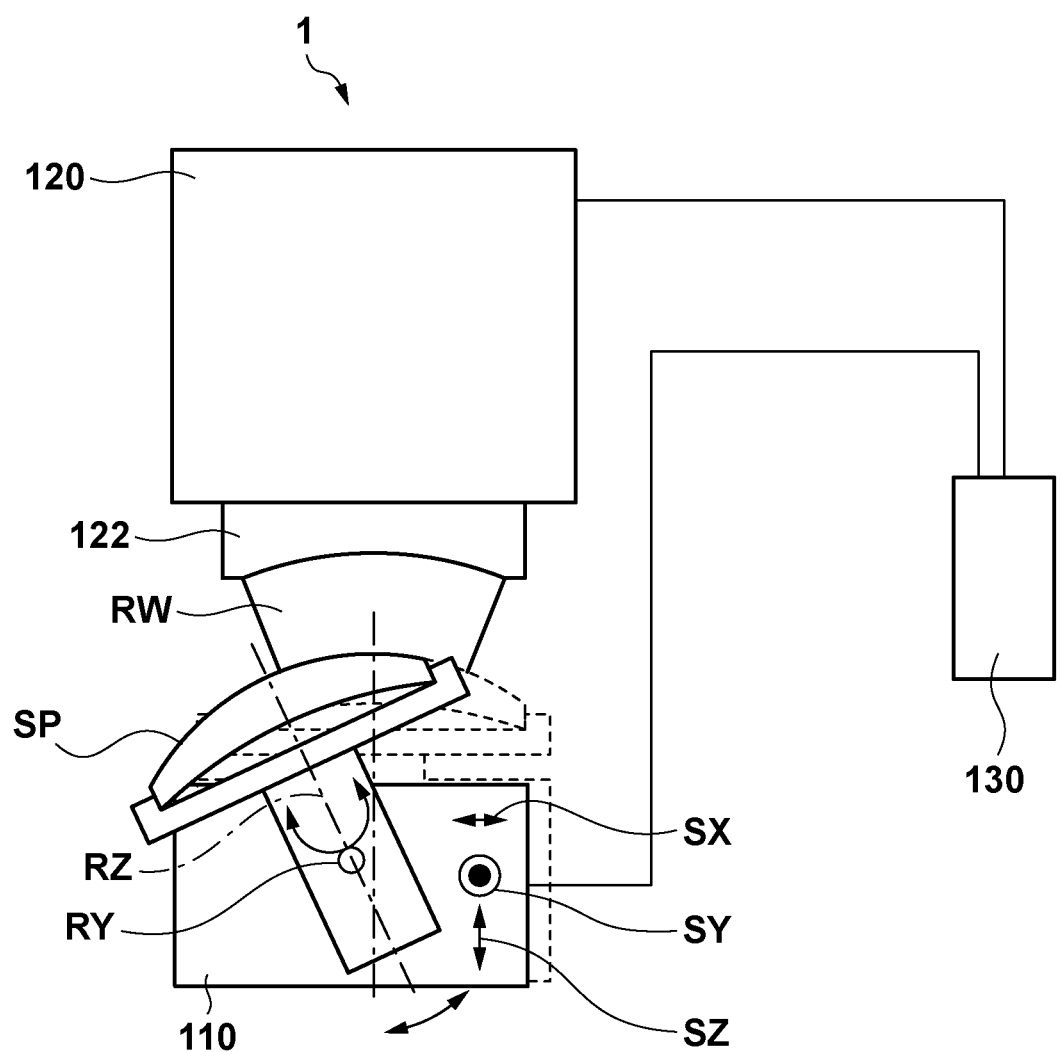

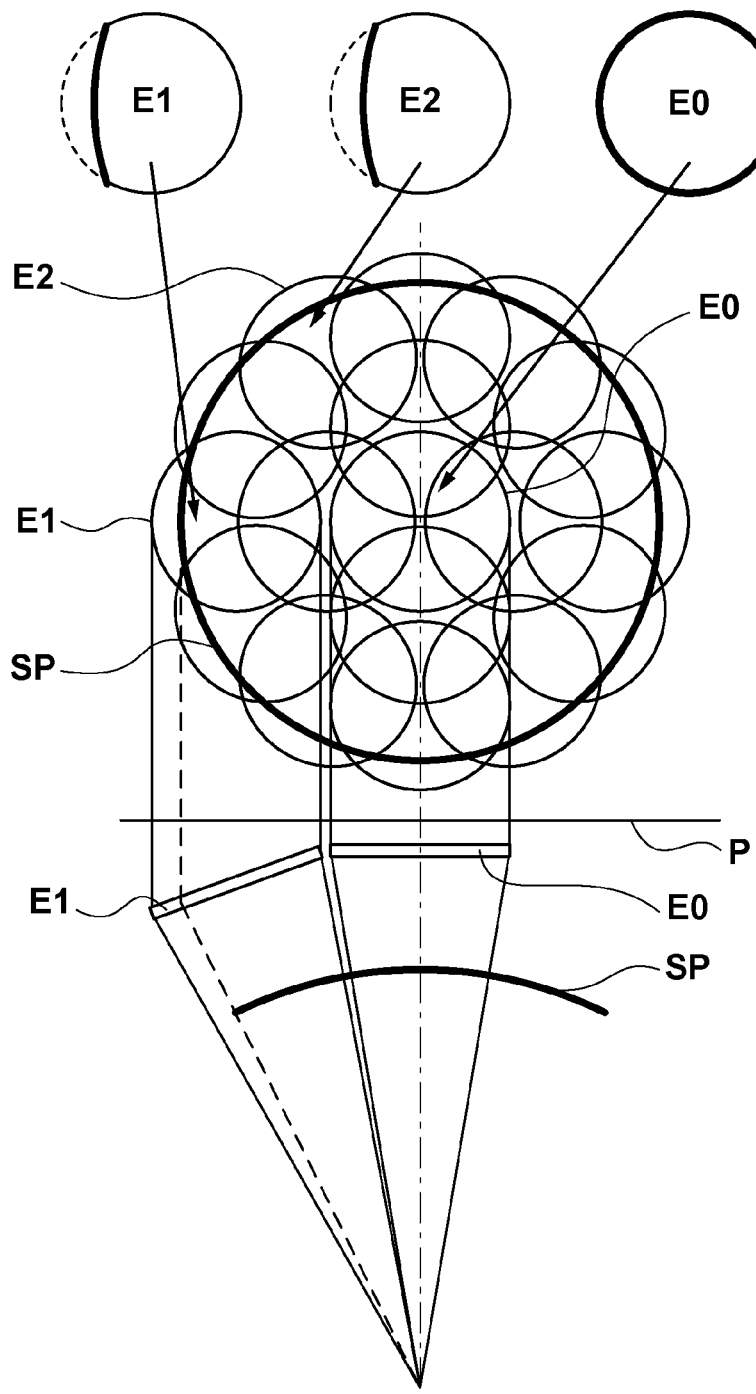

MEASUREMENT METHOD, MEASUREMENT APPARATUS, NON-TRANSITORY COMPUTER-READABLE STORAGE MEDIUM, AND OPTICAL ELEMENT FABRICATION METHOD

BACKGROUND OF THE INVENTION

1. Field of the Invention

The present invention relates to a measurement method of measuring the shape of a measurement target surface, a measurement apparatus, a non-transitory computer-readable storage medium, and an optical element fabrication method.

2. Description of the Related Art

As a technique for measuring the shape of the surface (measurement target surface) of an optical element such as a mirror or lens, a stitch method of measuring the shapes of a plurality of partial regions obtained by dividing the measurement target surface, and concatenating the shape data of the respective partial regions is well-known. The stitch method can measure a measurement target surface with a large diameter using a measurement apparatus with a small-diameter field of view (measurement region). In terms of the apparatus cost, therefore, the stitch method has the advantage over a case in which a measurement apparatus with a large-diameter field of view is used. Note that since the stitch method moves (for example, tilts, rotates, or translates) the measurement target surface to measure the shape of each partial region, it is necessary to strictly control the positional relationship between the shape data of the respective partial regions.

In the stitch method, therefore, high accuracy is required for the position of a rotation axis about which the measurement target surface rotates and the lateral magnification of the shape data of each partial region. A technique of calibrating them is proposed in U.S. Pat. No. 6,956,657. U.S. Pat. No. 6,956,657 discloses a technique of calibrating alignment errors, systematic errors, positioning errors, and the like so as to reduce errors in regions where a plurality of partial regions overlap each other.

In the conventional technique, however, it is possible to calibrate the position of the rotation axis about which the measurement target surface rotates but the computational load (computation amount) for obtaining the position of the rotation axis is heavy, thereby requiring a long time for the calibration. To reduce the computational load, a high performance processing apparatus or a measurement apparatus for calibration that measures the position of a rotation axis about which a measurement target surface rotates may be used, which, however, unwantedly increases the apparatus cost.

SUMMARY OF THE INVENTION

The present invention provides a technique that enables to obtain, based on the shape data of a partial contour region including the contour of a measurement target surface, the position of a rotation axis about which the measurement target surface rotates, and that is advantageous to measure the shape of the measurement target surface.

According to one aspect of the present invention, there is provided a measurement method of measuring a shape of a measurement target surface having a circular contour, including a first step of obtaining shape data by causing a stage which holds the measurement target surface to rotate the measurement target surface about a rotation axis, positioning each of a plurality of partial regions of the measurement target surface in a field of view of a measurement apparatus, and causing the measurement apparatus to measure each of the plurality of partial regions, a second step of obtaining, for each of a plurality of partial contour regions of the plurality of partial regions, which includes part of a contour of the measurement target surface, a central position of the measurement target surface using data of the contour included in the shape data, a third step of obtaining, based on the plurality of central positions obtained for the plurality of partial contour regions, a position of the rotation axis of the measurement target surface in positioning each of the plurality of partial regions, and a fourth step of obtaining the shape of the measurement target surface by concatenating the shape data of the plurality of partial regions using the position of the rotation axis obtained in the third step and a rotation angle of the measurement target surface by the stage in positioning each of the plurality of partial regions.

Further features of the present invention will become apparent from the following description of exemplary embodiments with reference to the attached drawings.

BRIEF DESCRIPTION OF THE DRAWINGS

FIG. 1 is a schematic view showing the arrangement of a measurement apparatus according to one aspect of the present invention.

FIGS. 4A to 4E are views for explaining partial regions set for the measurement target surface.

DESCRIPTION OF THE EMBODIMENTS

Figure 2A:
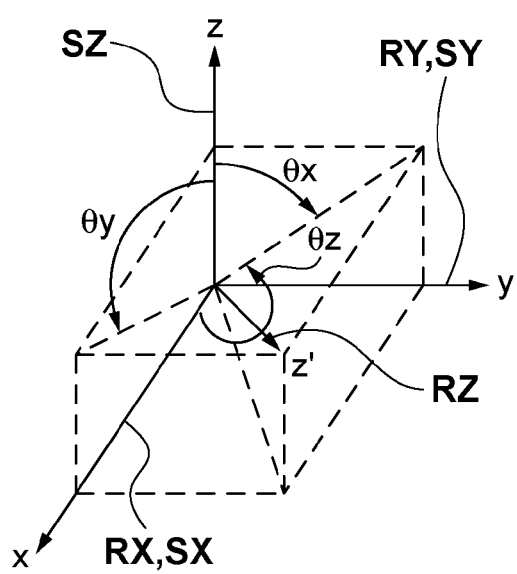
FIGS. 2A and 2B are views showing the movable axes of a stage in the measurement apparatus shown in FIG. 1.

Preferred embodiments of the present invention will be described below with reference to the accompanying drawings. Note that the same reference numerals denote the same members throughout the drawings, and a repetitive description thereof will not be given.

In the present invention, a stitch method of concatenating the shape data of a plurality of partial regions set to cover the whole measurement target surface is used to measure the shape of the measurement target surface such as the surface of an optical element.

<First Embodiment>

FIG. 1 is a schematic view showing the arrangement of a measurement apparatus 1 according to one aspect of the present invention. The measurement apparatus 1 includes a stage 110 for holding a measurement target object including a measurement target surface SP having a circular contour, an interferometer 120 including a transmission sphere 122, and a control unit 130 for controlling the measurement apparatus 1 as a whole.

The stage 110 has, as movable axes, a tilt axis RY about which the measurement target surface SP is tilted, a stage rotation axis RZ about which the measurement target surface SP rotates, and translation axes SX, SY, and SZ with respect to which the measurement target surface SP is translated. The interferometer 120 detects interference fringes between light reflected by the reference surface of the transmission sphere 122 and light RW reflected by the measurement target surface SP (more specifically, one of a plurality of partial regions set to cover the whole measurement target surface SP). The control unit 130 controls movement of the stage 110. The control unit 130 also converts the interference fringes detected by the interferometer 120 into shape data. The control unit 130, therefore, cooperates with the interferometer 120 to function as an obtaining unit which obtains shape data by rotating the stage 110 about the stage rotation axis RZ to position each partial region of the measurement target surface SP in the field of view of the interferometer 120, and measuring the partial region. The control unit 130 also functions as a processing unit which calculates the shape of the measurement target surface SP based on the shape data of the respective partial regions of the measurement target surface SP.

Figure 2B:
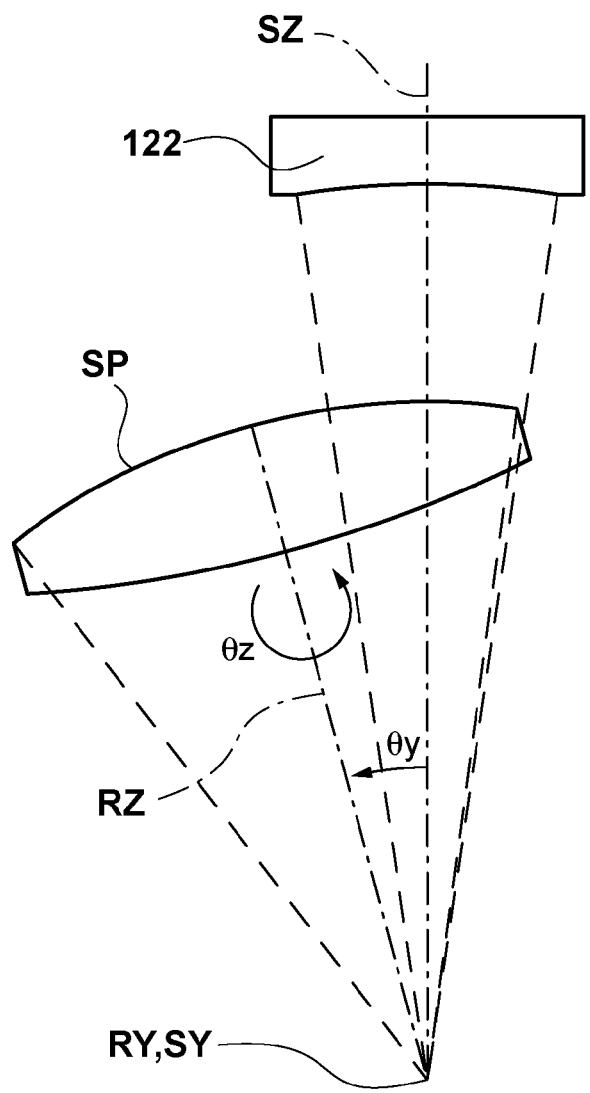

FIGS. 2A and 2B are views showing the movable axes of the stage 110 in the measurement apparatus 1. FIG. 2A shows a stage coordinate system according to the embodiment. As shown in FIG. 2A, θy represents a tilt angle about the y axis with reference to the θy tilt axis RY, and θx represents a tilt angle about the x axis with reference to the θx tilt axis RX. Furthermore, RZ represents a θz rotation axis obtained by tilting the translation axis SZ by (θx, θy), and θz represents a rotation axis about the θz rotation axis RZ. In this embodiment, since a tilt about the rotation axis RX is not used, coordinates (a θy-θz coordinate system) are represented using θy and θz. FIG. 2B shows a case in which the stage coordinate system shown in FIG. 2A is projected onto a zx plane. By tilting the measurement target surface SP about the tilt axis RY, and rotating it about the θz rotation axis RZ, it is possible to select a measurement target partial region on the measurement target surface SP (that is, it is possible to position the partial region in the field of view of the interferometer 120). At this time, if the tilt axis RY does not coincide with the center (center of curvature) of the measurement target surface SP, the tilt about the tilt axis RY may shift the positional relationship between the transmission sphere 122 and the measurement target surface SP. In this case, it is necessary to perform positional adjustment by moving the measurement target surface SP along the translation axes SX and SZ. By repeating the operation of tilting the measurement target surface SP about the tilt axis RY and rotating the surface about the θz rotation axis RZ, it is possible to measure all the partial regions of the measurement target surface SP.

Figure 3:
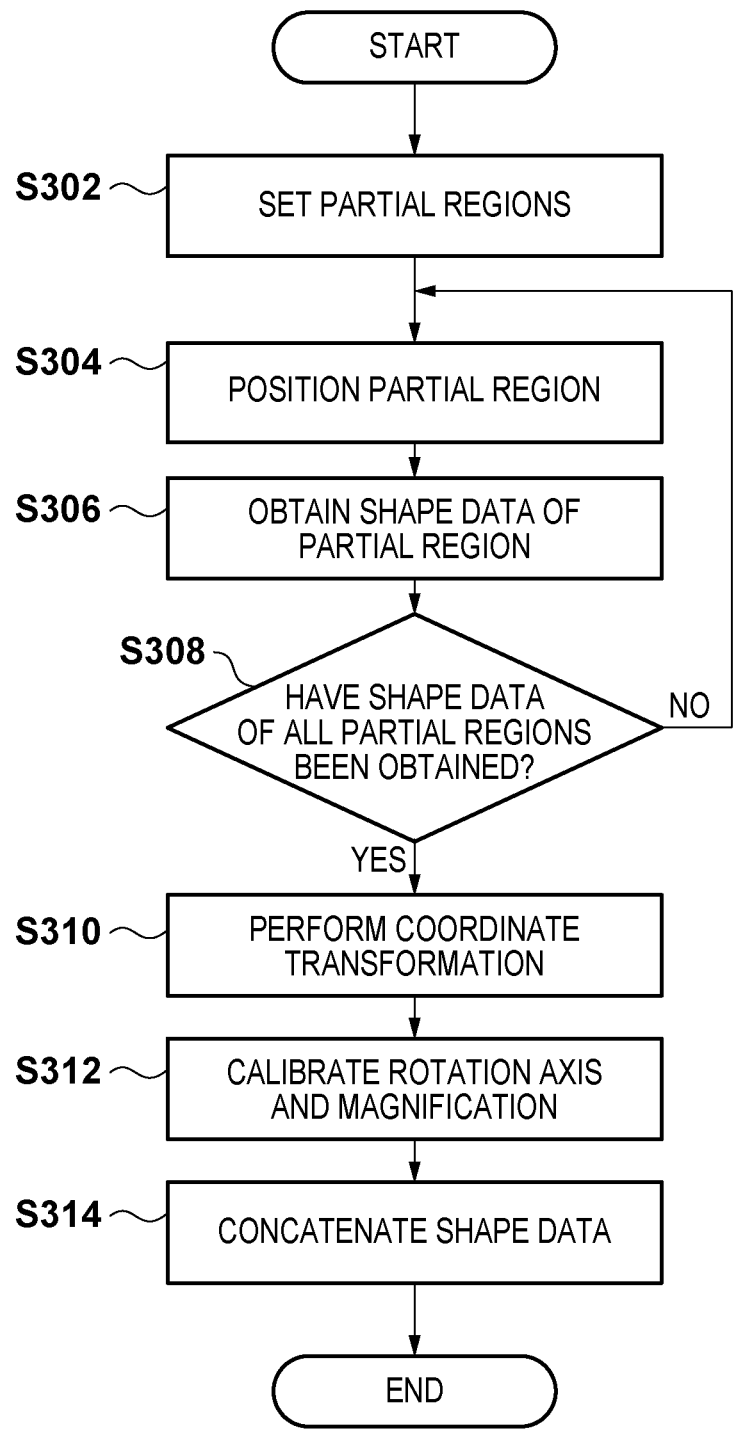
FIG. 3 is a flowchart for explaining measurement of the shape of a measurement target surface by the measurement apparatus shown in FIG. 1.

FIG. 3 is a flowchart for explaining measurement of the shape of the measurement target surface SP by the measurement apparatus 1. Each process shown in FIG. 3 is executed when the control unit 130 comprehensively controls each unit of the measurement apparatus 1.

In step S302, a plurality of partial regions are set for the measurement target surface SP so that they cover the whole measurement target surface SP and adjacent partial regions overlap each other. The partial regions set for the measurement target surface SP are different depending on the size and curvature radius of the measurement target surface SP, the interferometer 120, the transmission sphere 122, and the like.

FIGS. 4A to 4E are views for explaining the partial regions set for the measurement target surface SP. FIG. 4D shows an example of arrangement of the partial regions set for the measurement target surface SP, in which circular partial regions are two-dimensionally arranged for the measurement target surface SP having a circular contour. Shape data obtained by measuring each partial region is represented by a two-dimensional array on the X-Y rectangular coordinate system, which needs to undergo coordinate transformation to comply with the θy-θz coordinate system. In other words, the shape data of each partial region is obtained by tilting the stage 110 by θy, and measuring the partial region, as shown in FIG. 4E. When coordinate transformation is performed to obtain shape data by projecting the shape data of all the partial regions onto one common projection plane P, the shape data of partial regions other than a partial region set at the center of the measurement target surface SP represent ellipses instead of perfect circles. FIGS. 4A, 4B, and 4C show examples of shape data E1, E2, and E0 obtained by measuring the respective partial regions of the measurement target surface SP, respectively. FIG. 4A shows the shape data E1 of the partial region which can be measured by tilting the stage 110 about the tilt axis RY by θy. In this case, since the partial region is measured by tilting the stage 110 about the tilt axis RY by θy, it is necessary to perform coordinate transformation to project the shape data E1 onto the projection plane P. FIG. 4B shows the shape data E2 of the partial region which can be measured by tilting the stage 110 about the tilt axis RY by θy, and rotating the stage 110 about the θz stage rotation axis RZ by θz. In this case, since the partial region is measured by rotating the stage 110 about the θz rotation axis RZ by θz, it is necessary to rotate the stage 110 about the θz rotation axis RZ in the reverse direction in addition to coordinate transformation. FIG. 4C shows the shape data E0 of the partial region positioned at the center of the measurement target surface SP. In this case, since the stage 110 is not tilted about the tilt axis RY or rotated about the θz rotation axis RZ, coordinate transformation is not necessary.

In step S304, the relative positional relationship between the measurement target surface SP and the interferometer 120 is changed to position a partial region in the field of view of the interferometer 120. More specifically, by tilting and rotating the stage 110, one (a measurement target partial region) of the plurality of partial regions set for the measurement target surface SP is positioned in the field of view of the interferometer 120.

In step S306, the interferometer 120 measures the partial region positioned in its field of view to obtain the shape data of the partial region.

In step S308, it is determined whether the shape data of all the partial regions set for the measurement target surface SP have been obtained. If the shape data of not all the partial regions have been obtained, the process returns to step S304 to position a next measurement target partial region in the field of view of the interferometer 120. Alternatively, if the shape data of all the partial regions have been obtained, the process advances to step S310.

In step S310, coordinate transformation is performed for the shape data of the partial regions obtained by executing the processing in steps S304 to S308. Note that coordinate transformation of the shape data of the partial regions is as described with reference to FIGS. 4A to 4E.

In step S312, the rotation axis (the position thereof) and lateral magnification of the shape data of the partial regions obtained by executing the processing in steps S304 to S308 are calibrated. For example, the shape data E2 shown in FIG. 4B is obtained by rotating the stage 110 about the θz rotation axis RZ. To concatenate such shape data, it is necessary to obtain a rotation axis (the position thereof) about which the measurement target surface SP rotates as the stage 110 rotates, and to rotate the shape data of the partial regions about the rotation axis in the reverse direction. At this time, if the position of the stage rotation axis of the stage 110 in measuring the partial regions does not coincide with that of the rotation axis of the measurement target surface SP in concatenating the shape data, the positional relationship between the shape data of the respective partial regions shifts inadvertently.

Figure 5A:
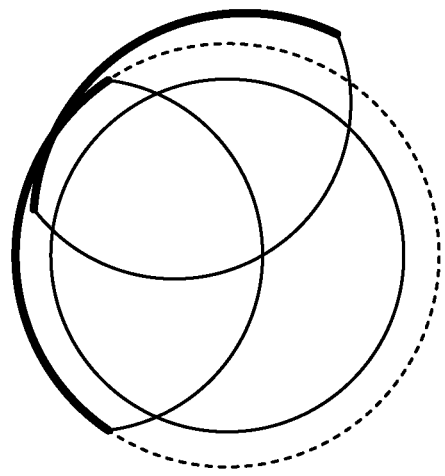
FIGS. 5A to 5C are views each showing an example of the positional relationship between the shape data of the partial regions when the shape data are concatenated.
Figure 5B:
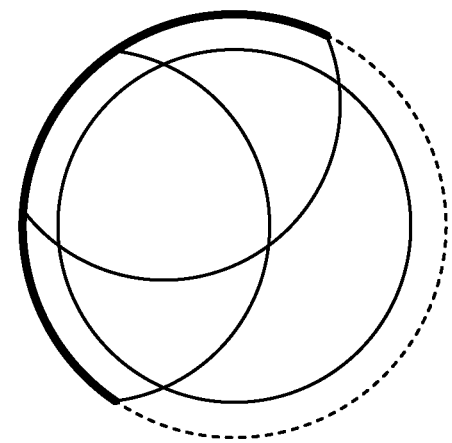
Figure 5C:
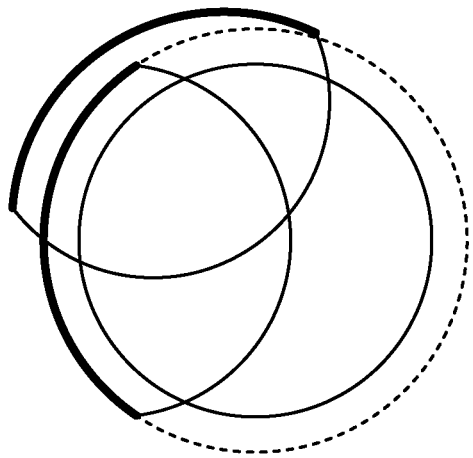

FIGS. 5A to 5C are views each showing an example of the positional relationship between the shape data of the partial regions when the shape data are concatenated. FIG. 5B shows the positional relationship between the shape data if the position of the stage rotation axis of the stage 110 in measuring the partial regions coincides with that of the rotation axis of the measurement target surface SP in concatenating the shape data. FIG. 5A or 5C shows the positional relationship between the shape data if the position of the stage rotation axis of the stage 110 in measuring the partial regions does not coincide with that of the rotation axis of the measurement target surface SP in concatenating the shape data. Thick lines shown in FIGS. 5A to 5C represent the contours of the shape data of the partial regions. Referring to FIGS. 5A and 5C, it is necessary to calibrate the rotation axis of the shape data of the partial regions.

Calibration of the rotation axis of the shape data of the partial regions will be described. Based on the shape data of a plurality of partial contour regions, each of which includes part of the outer contour of the measurement target surface SP, of the plurality of partial regions, the rotation axis about which the measurement target surface SP rotates as the stage 110 rotates is obtained. Especially in this embodiment, at least three partial contour regions, which are equiangularly positioned from the center of the measurement target surface SP, are selected from the plurality of partial regions, and the rotation axis about which the measurement target surface SP rotates is obtained based on the shape data of the selected partial contour regions. Assume that three partial contour regions (that is, partial contour regions having three-fold rotational symmetry) which are equiangularly positioned from the center of the measurement target surface SP are selected.

Figure 6:
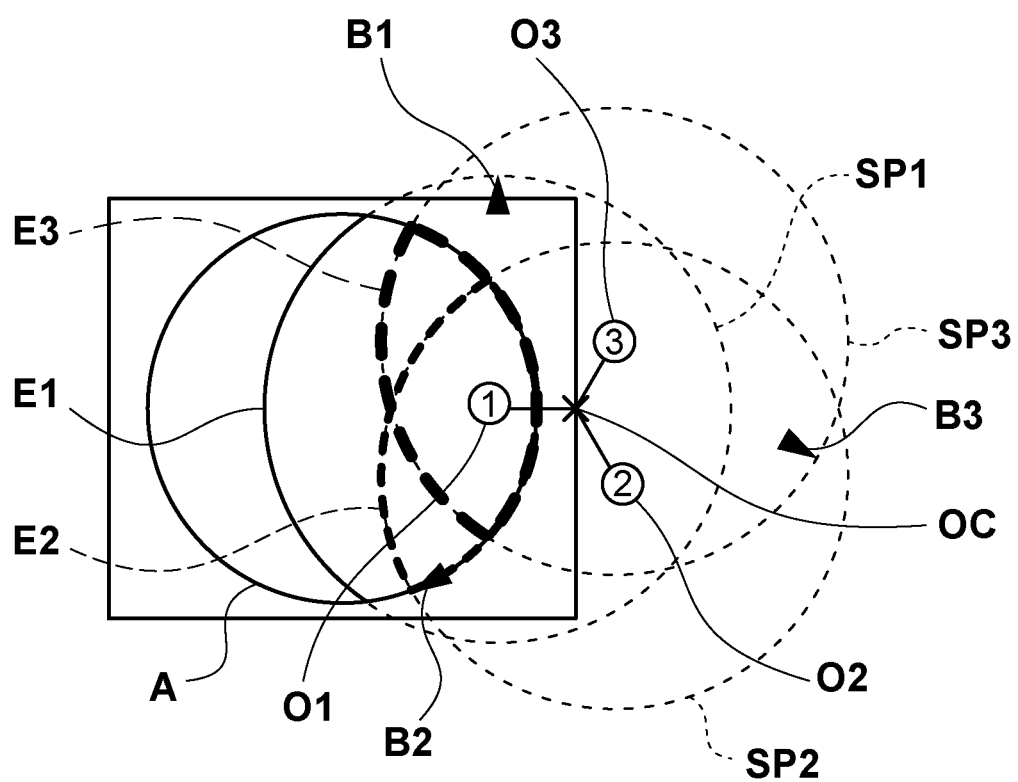
FIG. 6 is a view for explaining calibration of the rotation axis of the shape data of the partial regions.

FIG. 6 is a view for explaining calibration of the rotation axis of the shape data of the partial regions. FIG. 6 shows the relationship between the rotation axis about which the measurement target surface SP rotates and the position of the center of the measurement target surface SP indicated by contour data which is included in the shape data of each partial contour region and corresponds to part of the contour of the measurement target surface. Reference symbols SP1, SP2, and SP3 denote the same measurement target surface SP, which are discriminated depending on the value of θz of the stage 110 and on the circumferences of which triangular marks B1, B2, and B3 are shown, respectively. In other words, the mark B1 indicates the orientation of the measurement target surface SP1, the mark B2 indicates the orientation of the measurement target surface SP2, and the mark B3 indicates the orientation of the measurement target surface SP3. Reference symbol A denotes the range of one measurement operation of the interferometer 120, that is, the field of view of the interferometer 120.

If, for example, the interferometer 120 measures the measurement target surface SP1 in the positional relationship shown in FIG. 6, the shape data E1 of the corresponding partial contour region is obtained. Furthermore, if the interferometer 120 measures the measurement target surface SP2 (that is, the measurement target surface SP1 is rotated about a position OC by 120°, and is measured) in the positional relationship shown in FIG. 6, the shape data E2 of the corresponding partial contour region is obtained. Similarly, if the interferometer 120 measures the measurement target surface SP3 (that is, the measurement target surface SP1 is rotated about the position OC by 240°, and is measured) in the positional relationship shown in FIG. 6, the shape data E3 of the corresponding partial contour region is obtained. The shape data E1, E2, and E3 are measured by rotating the measurement target surface SP1 about the position OC. To concatenate the shape data E1, E2, and E3, therefore, it is necessary to rotate the shape data E1, E2, and E3 about the position OC in the reverse direction. It is, however, impossible to specify the position OC on the data. To deal with this problem, in this embodiment, the position OC (that is, the position of the rotation axis about which the measurement target surface SP1 rotates as the stage 110 rotates) is obtained using the shape data E1, E2, and E3 of the partial contour regions.

Coordinate transformation is first executed for the shape data E1, E2, and E3 of the partial contour regions. In this embodiment, the outer contour of the measurement target surface is considered. As described above, since the shape data of a partial region is obtained by tilting the measurement target surface (stage), it indicates a shape obtained by observing the circular contour from diagonally above, which is an ellipse. If, therefore, the position OC is obtained without executing coordinate transformation for the shape data E1, E2, and E3 of the partial contour regions, the obtained position OC includes an error. It is possible to avoid this problem by projecting the shape data E1, E2, and E3 of the partial contour regions which have been obtained by tilting the measurement target surface (stage) to comply with the coordinate system (projection plane P) with the tilt angle θy=0.

An arc included in the shape data E1 is contour data corresponding to part of the outer contour of the measurement target surface SP1, and based on its center, a position O1 of the center of the measurement target surface SP1 is obtained. An arc included in the shape data E2 is contour data corresponding to part of the outer contour of the measurement target surface SP2, and based on its center, a position O2 of the center of the measurement target surface SP2 is obtained. Similarly, an arc included in the shape data E3 is contour data corresponding to part of the outer contour of the measurement target surface SP3, and based on its center, a position O3 of the center of the measurement target surface SP3 is obtained. Note that as a method of obtaining the center of an arc, for example, there are a method of selecting three arbitrary points on the arc, and obtaining a circle which passes through the three points, a method of selecting two arbitrary points on the arc, and obtaining a point at which lines respectively perpendicular to tangents at the two points intersect each other, and the like. As a method of obtaining the center of an arc, there is also a method of selecting several points on the arc, and obtaining a position at equal distances from the several points.

In this embodiment, as described above, the three partial contour regions which are positioned at the same angle 120° from the center of the measurement target surface are selected. It is, therefore, possible to obtain the position OC as an average of the positions O1, O2, and O3 (that is, a position at equal distances from the positions O1, O2, and O3), as indicated by equations (1). In equations (1), (x1, y1), (x2, y2), and (x3, y3) represent the coordinates of the positions O1, O2, and O3, respectively, and (xc, yc) represents the coordinates of the position OC.

$$\begin{cases} x_c = \dfrac{x_1 + x_2 + x_3}{3} \\ y_c = \dfrac{y_1 + y_2 + y_3}{3} \end{cases} \quad (1)$$

Note that although the position OC is obtained using the shape data of the three partial contour regions in this embodiment, the number of partial contour regions is not limited to three. For example, n (n is an integer of 2 or larger) partial contour regions which are equiangularly positioned from the center of the measurement target surface need only be selected, and the position OC may be obtained using the shape data of two partial contour regions or the shape data of four partial contour regions.

Calibration of a lateral magnification u of the shape data of the partial regions will be described. The lateral magnification u indicates the ratio between the radius of the measurement target surface SP and the distance between the contour of the measurement target surface and each of the plurality of positions (for example, the positions O1, O2, and O3) of the center of the measurement target surface SP which are obtained for the plurality of partial contour regions. It is, therefore, possible to calibrate the lateral magnification u using a known radius rs [mm] of the measurement target surface SP, and a radius rd [pixels] in the data of the measurement target surface SP. In this embodiment, to calibrate the rotation axis of the shape data of the partial regions, the position OC of the rotation axis about which the measurement target surface SP rotates is obtained. It is, therefore, possible to obtain the radius rd in the data of the measurement target surface SP by obtaining the number of pixels between the position OC and an arbitrary point on the outer contour (contour data) of the measurement target surface SP. As described above, it is possible to calibrate the lateral magnification u of the shape data of the partial regions according to rs/rd [mm/pixel].

Referring back to FIG. 3, in step S314, the shape data of the partial regions obtained by executing the processing in steps S304 to S308 are concatenated. More specifically, the respective shape data of the plurality of partial regions are concatenated using the rotation angle of the stage 110 in positioning each partial region, and the lateral magnification u and the position OC of the rotation axis about which the measurement target surface SP rotates, that have been obtained in step S312.

Figure 7:
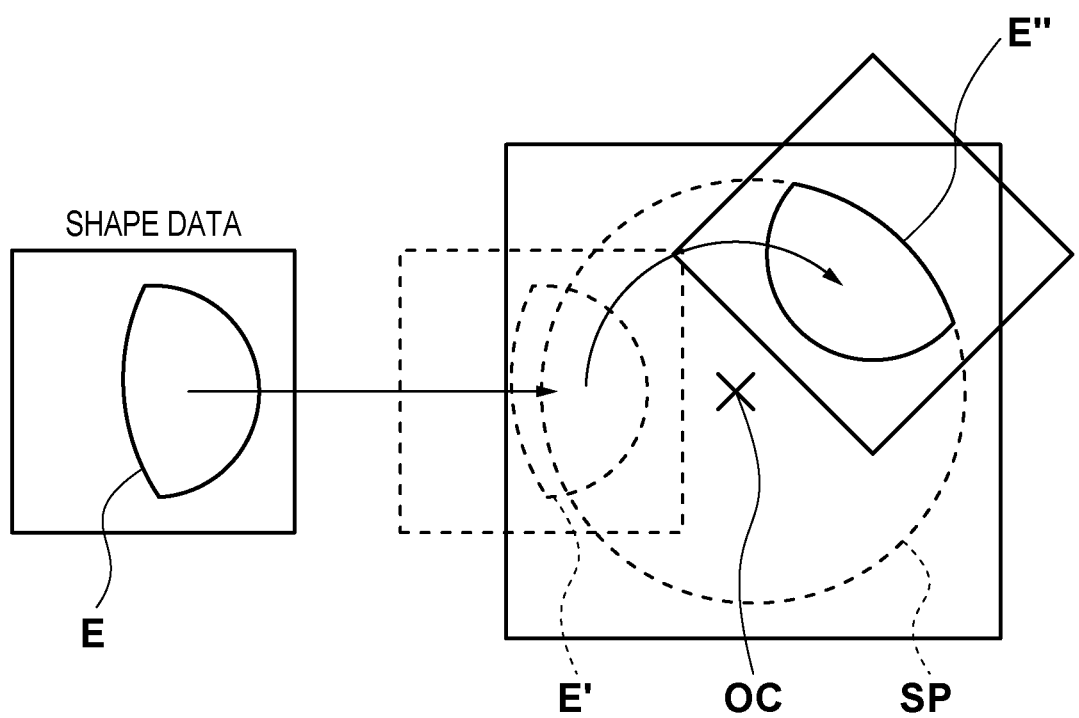
FIG. 7 is a view for explaining concatenation of the shape data of the partial regions.

FIG. 7 is a view for explaining concatenation of the shape data of the partial regions. Referring to FIG. 7, using the lateral magnification u and the position OC of the rotation axis about which the measurement target surface SP rotates, the shape data E of each partial region corresponding to a partial region of the measurement target surface SP is arranged according to conditions (partial region setting conditions) under which the partial regions are set for the measurement target surface SP. The partial region setting conditions are defined by the tilt angle θy and rotation angle θz of the stage 110, which are transformed into X-Y coordinates ([unit: mm]) complying with a coordinate plane on which the measurement target surface SP is two-dimensionally projected. The shape data E of each partial region is arranged according to coordinates (unit: number of pixels) in the interferometer 120. In this transformation, the lateral magnification u of the measurement target surface SP obtained in step S312 is applied.

Figure 8A:
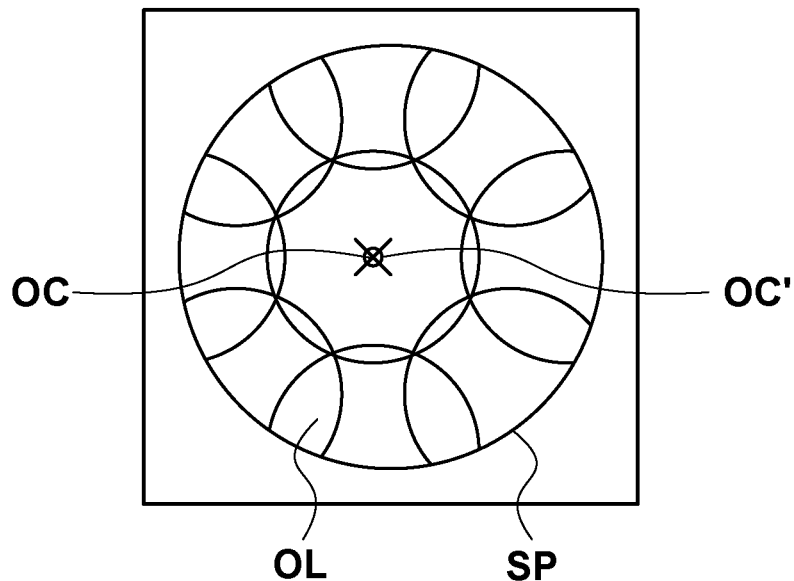
FIGS. 8A and 8B are views each showing a state in which the shape data of the respective partial regions are concatenated.
Figure 8B:
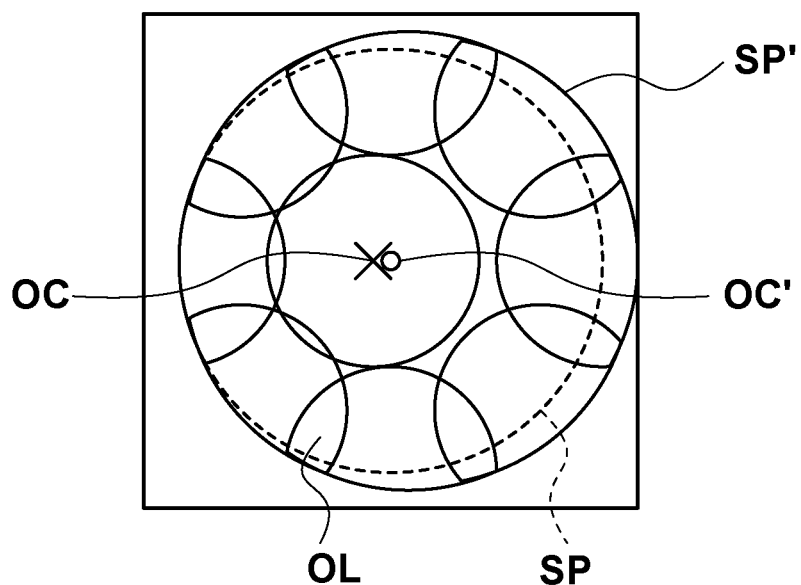

Shape data E″ is obtained by rotating (for example, rotating in the reverse direction of a rotation direction in measurement) shape data E′ of a partial region, which has been arranged according to the partial region setting conditions, about the position OC of the rotation axis about which the measurement target surface SP rotates, that has been obtained in step S312. By executing such processing for the shape data E of each partial region, it is possible to concatenate the shape data of the respective partial regions, as shown in FIG. 8A. FIG. 8A shows a case in which the rotation axis and lateral magnification of the shape data of each partial region has been calibrated. FIG. 8B shows a case in which the rotation axis of the shape data of each partial region has not been calibrated. In FIGS. 8A and 8B, reference symbol OC′ denotes a position about which the shape data of each partial region rotates. The measurement target surface SP corresponds to a result when the shape data of the respective partial regions are concatenated ideally. Reference symbol SP′ denotes a result of concatenating the shape data of the respective partial regions. Referring to FIG. 8A, the results SP and SP′ coincide with each other, which means that the shape data of the respective partial regions have ideally been concatenated. On the other hand, referring to FIG. 8B, the results SP and SP′ do not coincide with each other, which means that the shape data of the respective partial regions have not ideally been concatenated. In other words, if the rotation axis of the shape data of each partial region is not calibrated, it is impossible to correctly concatenate the shape data of the respective partial regions.

As described above, according to this embodiment, based on the shape data of partial contour regions each including part of the outer contour of the measurement target surface SP, it is possible to obtain, by relatively easy calculation, in a short time, the lateral magnification u and the position OC of the rotation axis about which the measurement target surface SP rotates. The measurement apparatus 1 can, therefore, correctly concatenate the shape data of the respective partial regions while calibrating the rotation axis and lateral magnification of the shape data of the partial regions without increasing the apparatus cost, thereby measuring the shape of the measurement target surface SP with high accuracy.

<Second Embodiment>

In the first embodiment, a method of selecting, from the plurality of partial regions, at least three partial contour regions which are equiangularly positioned from the center of the measurement target surface SP, and obtaining, based on the shape data of the partial contour regions, a rotation axis about which the measurement target surface SP rotates has been described. In this embodiment, a method of selecting at least three partial contour regions (that is, arbitrary partial contour regions) from a plurality of partial regions, and obtaining, based on the shape data of the selected partial contour regions, a rotation axis about which a measurement target surface SP rotates will be described. Assume in this example that three partial contour regions are selected.

Figure 9:
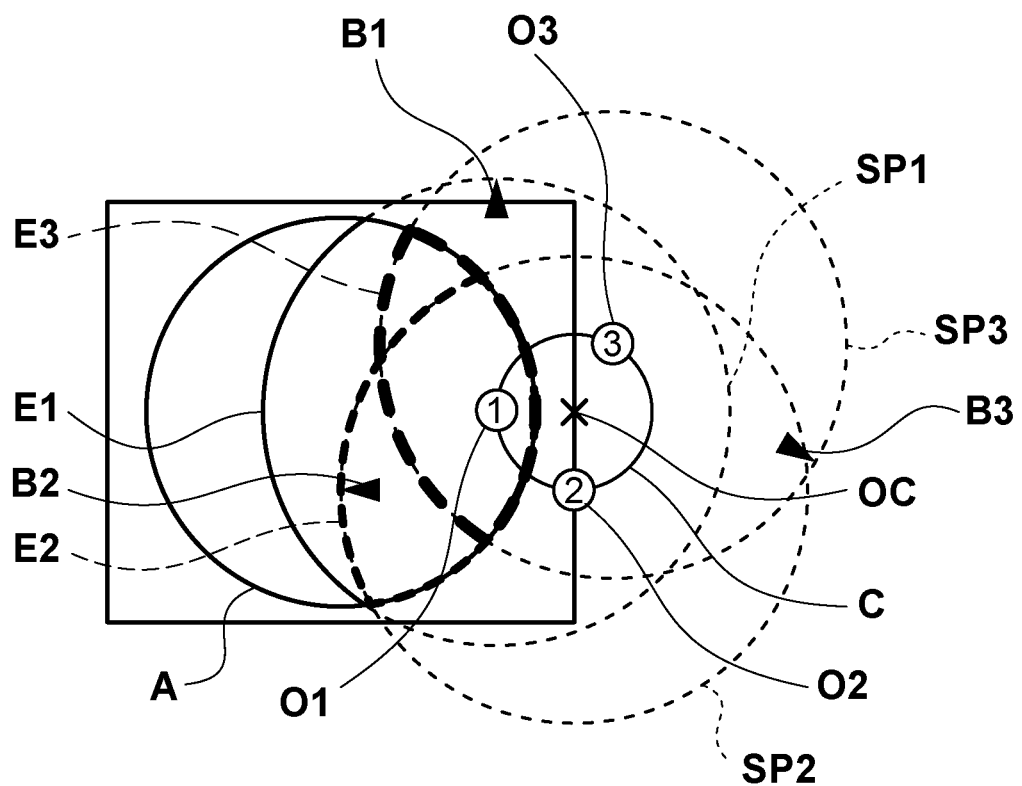
FIG. 9 is a view for explaining calibration of the rotation axis of the shape data of partial regions.

FIG. 9 is a view for explaining calibration of the rotation axis of the shape data of the partial regions. FIG. 9 shows the relationship between the rotation axis about which the measurement target surface SP rotates and the position of the center of the measurement target surface SP indicated by contour data which is included in the shape data of each partial contour region and corresponds to part of the contour of the measurement target surface. Reference symbols SP1, SP2, and SP3 denote the same measurement target surface SP, which are discriminated depending on the value of θz of a stage 110, and on the circumferences of which triangular marks B1, B2, and B3 are shown, respectively. In other words, the mark B1 indicates the orientation of the measurement target surface SP1, the mark B2 indicates the orientation of the measurement target surface SP2, and the mark B3 indicates the orientation of the measurement target surface SP3.

If, for example, an interferometer 120 measures the measurement target surface SP1 in the positional relationship shown in FIG. 9, shape data E1 of the corresponding partial contour region is obtained. Furthermore, if the interferometer 120 measures the measurement target surface SP2 (that is, the measurement target surface SP1 is rotated about a position OC by 90°, and is measured) in the positional relationship shown in FIG. 9, shape data E2 of the corresponding partial contour region is obtained. Similarly, if the interferometer 120 measures the measurement target surface SP3 (that is, the measurement target surface SP1 is rotated about the position OC by 240°, and is measured) in the positional relationship shown in FIG. 9, shape data E3 of the corresponding partial contour region is obtained. The shape data E1, E2, and E3 are measured by rotating the measurement target surface SP1 about the position OC. To concatenate the shape data E1, E2, and E3, therefore, it is necessary to rotate the shape data E1, E2, and E3 about the position OC in the reverse direction. It is, however, impossible to specify the position OC on the data. To deal with this problem, in this embodiment, the position OC (that is, the position of the rotation axis about which the measurement target surface SP1 rotates as the stage 110 rotates) is obtained using the shape data E1, E2, and E3 of the partial contour regions.

As in the first embodiment, coordinate transformation is first executed for the shape data E1, E2, and E3 of the partial contour regions.

An arc included in the shape data E1 is contour data corresponding to part of the outer contour of the measurement target surface SP1, and based on its center, a position O1 of the center of the measurement target surface SP1 is obtained. An arc included in the shape data E2 is contour data corresponding to part of the outer contour of the measurement target surface SP2, and based on its center, a position O2 of the center of the measurement target surface SP2 is obtained. Similarly, an arc included in the shape data E3 is contour data corresponding to part of the outer contour of the measurement target surface SP3, and based on its center, a position O3 of the center of the measurement target surface SP3 is obtained.

In this embodiment, a circle C having, on its circumference, the positions O1, O2, and O3 is obtained. Let (x1, y1), (x2, y2), and (x3, y3) be the coordinates of the positions O1, O2, and O3, respectively, (xc, yc) be the coordinates of the position OC, and r be the radius of the circle C. Then, $$\begin{cases} (x_1 - x_c)^2 + (y_1 - y_c)^2 = r^2 \\ (x_2 - x_c)^2 + (y_2 - y_c)^2 = r^2 \\ (x_3 - x_c)^2 + (y_3 - y_c)^2 = r^2 \end{cases} \quad (2)$$

By solving simultaneous equations (2), it is possible to obtain the coordinates (xc, yc) of the position OC according to equation (3). In this embodiment, the position of the center of the circle C having, on its circumference, the positions O1, O2, and O3 is obtained as the position OC.

$$\begin{pmatrix} x_c \\ y_c \end{pmatrix} = \begin{pmatrix} 2(x_3 - x_2) & 2(y_3 - y_2) \\ 2(x_2 - x_1) & 2(y_2 - y_1) \end{pmatrix}^{-1} \begin{pmatrix} x_3^2 - x_2^2 + y_3^2 - y_2^2 \\ x_2^2 - x_1^2 + y_2^2 - y_1^2 \end{pmatrix} \quad (3)$$

Figure 10A:
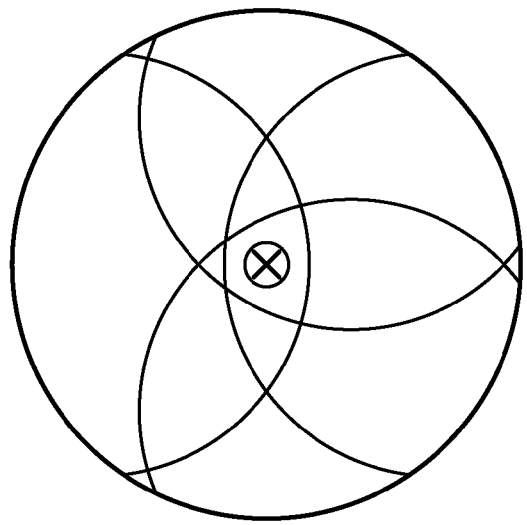
FIGS. 10A and 10B are views each showing a state in which the shape data of the respective partial regions are concatenated.
Figure 10B:
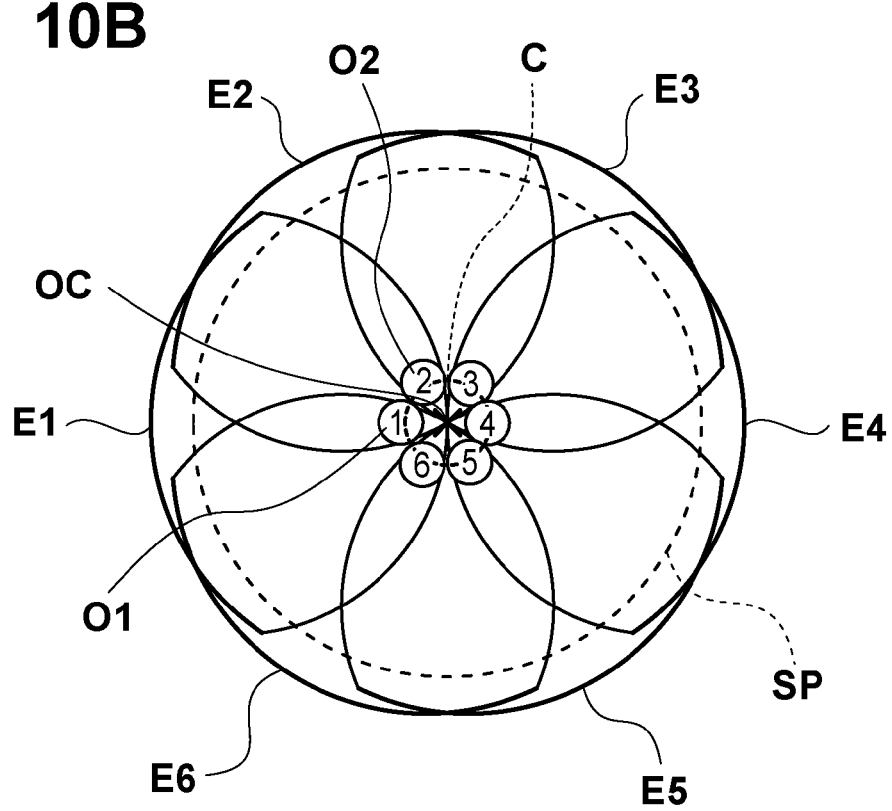

Calibration of a lateral magnification u of the shape data of the partial regions will be described. In this embodiment, a temporary lateral magnification u' is set, and the shape data of the respective partial regions are arranged using the temporary lateral magnification u' and the position OC of the rotation axis about which the measurement target surface SP rotates, that have been obtained in step S312. FIG. 10A is a view showing a state in which the shape data of the respective partial regions are concatenated when the lateral magnification u is appropriate. FIG. 10B is a view showing a state in which the shape data of the respective partial regions are concatenated when the lateral magnification u is inappropriate. The position of the center of the measurement target surface SP indicated by the contour data included in the shape data E1 is the position O1. Similarly, the positions of the center of the measurement target surface SP indicated by the contour data included in shape data E2 to E6 are positions O2 to O6, respectively.

Assuming the circle C having, on its circumference, the positions O1 to O6, the lateral magnification u is obtained based on the radius of the circle C in this embodiment. If the lateral magnification u is appropriate, the radius of the circle C is 0 (zero), as shown in FIG. 10A. The lateral magnification u, therefore, need only be obtained so that the radius of the circle C becomes 0. For example, assume that the temporary lateral magnification u' [mm/pixel] is set by assuming that the shape data E1 corresponds to the position of s [mm] in a real space. In this case, if the radius of the circle C in the shape data is t [number of pixels], the actual lateral magnification u is obtained by:

$$u = \frac{s}{\frac{s}{u'} - t} \quad (4)$$

Figure 11:
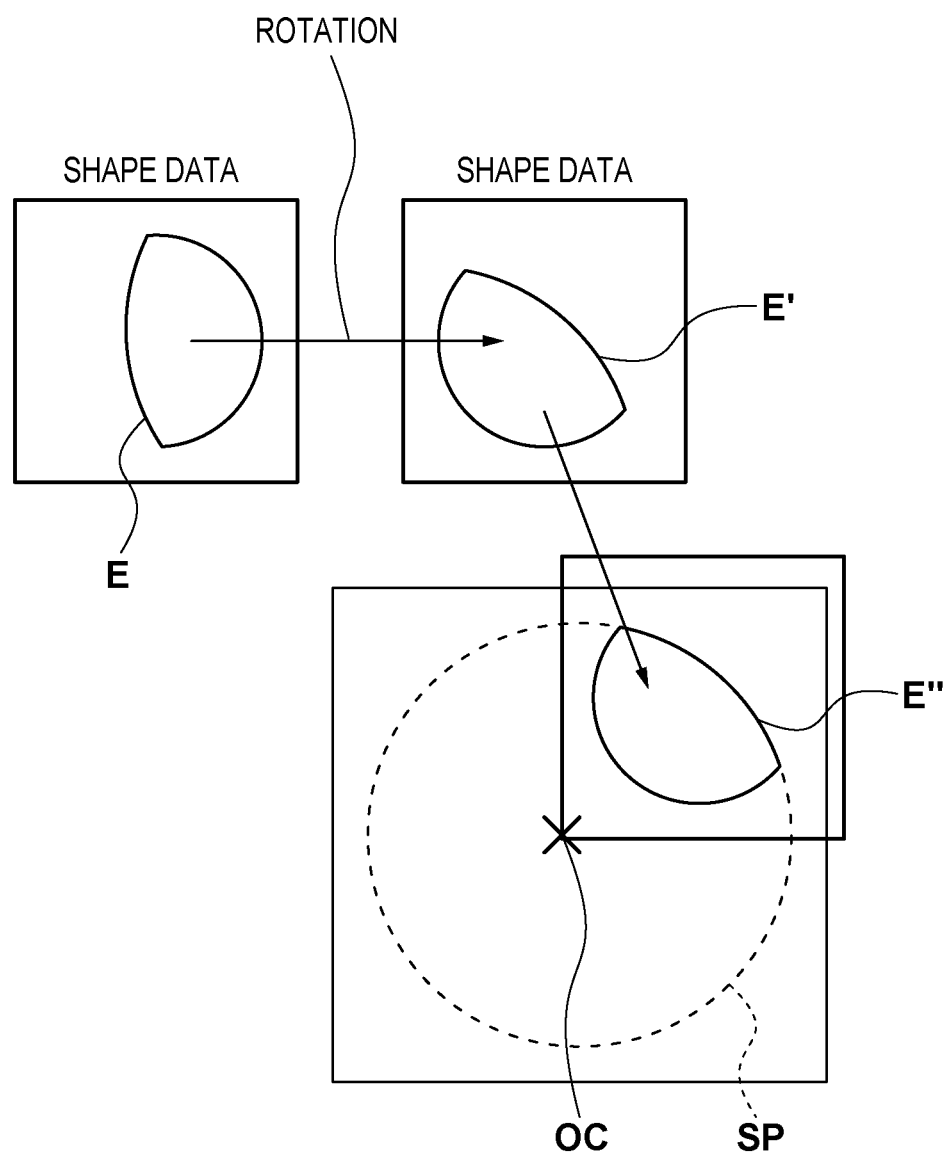
FIG. 11 is a view for explaining concatenation of the shape data of the partial regions.

FIG. 11 is a view for explaining concatenation of the shape data of the partial regions. Referring to FIG. 11, shape data E' is obtained by rotating the shape data E of each partial region about the position OC. Then, shape data E" is obtained by arranging the shape data E' according to the lateral magnification u and partial region setting conditions. By executing such processing for the shape data E of each partial region, it is possible to concatenate the shape data of the respective partial regions, as shown in FIG. 8A.

As described above, according to this embodiment, based on the shape data of partial contour regions each including part of the outer contour of the measurement target surface SP, it is possible to obtain, by relatively easy calculation, in a short time, the lateral magnification u and the position OC of the rotation axis about which the measurement target surface SP rotates. A measurement apparatus 1 can, therefore, correctly concatenate the shape data of the respective partial regions while calibrating the rotation axis and lateral magnification of the shape data of the partial regions without increasing the apparatus cost, thereby measuring the shape of the measurement target surface SP with high accuracy.

<Third Embodiment>

Although in the first embodiment, coordinate transformation is performed for the shape data of each partial region in step S310, it is not always necessary to perform coordinate transformation for the shape data of each partial region. If coordinate transformation is not performed for the shape data of each partial region, the shape data of the partial region indicates a shape obtained by observing a circular contour from diagonally above, which is an ellipse, as described above. Note that the flattening is not such large, and the shape may be approximately regarded as a circle.

In this embodiment, a rotation axis about which a measurement target surface SP rotates is obtained by considering the contour as a circle without performing coordinate transformation for the shape data of each partial region. As described above, if an elliptic arc is approximated by a circular arc, the radius of a circle C shown in FIG. 9 is different from that when coordinate transformation is performed for the shape data. Note that if a tilt angle θy in measuring each partial region of the measurement target surface SP is the same, distortion in the shape data due to tilt uniformly occurs in all the partial regions. Even if, therefore, coordinate transformation is not performed for the shape data of each partial region, the same result is obtained with respect to the position of the center of the circle C shown in FIG. 9. Since the position of the center of the circle C shown in FIG. 9 is required to calibrate the rotation axis of the shape data of the partial regions, it is possible to calibrate the rotation axis of the shape data of the partial regions without performing coordinate transformation for the shape data of the partial regions. Since, however, the radius of the circle C shown in FIG. 9 is required to calibrate the lateral magnification of the shape data of the partial regions, it is necessary to perform coordinate transformation for the shape data of the partial regions or to calibrate an error occurring in coordinate transformation after obtaining the radius of the circle C shown in FIG. 9.

In this embodiment, a method of selecting four partial contour regions (that is, arbitrary partial contour regions) from the plurality of partial regions, and obtaining, based on the shape data of the selected partial contour regions, a rotation axis about which the measurement target surface SP rotates will be described.

Figure 12:
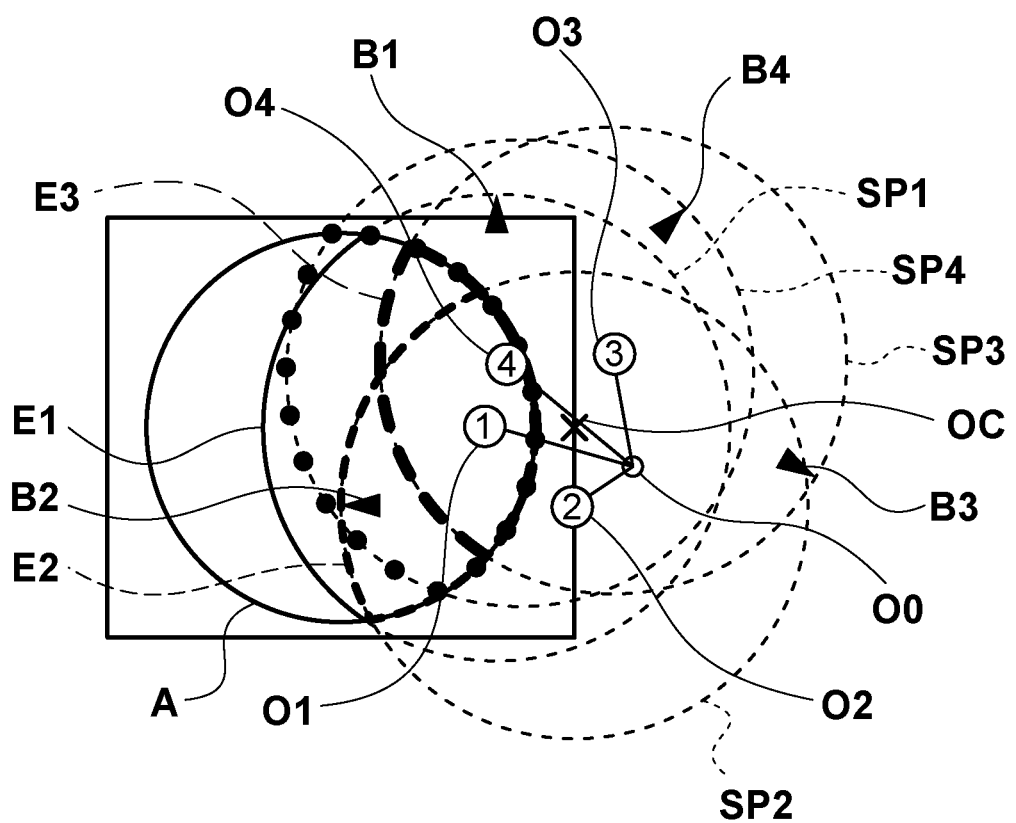
FIG. 12 is a view for explaining calibration of the rotation axis of the shape data of partial regions.

FIG. 12 is a view for explaining calibration of the rotation axis of the shape data of the partial regions. FIG. 12 shows the relationship between the rotation axis about which the measurement target surface SP rotates and the position of the center of the measurement target surface SP indicated by contour data which is included in the shape data of each partial contour region and corresponds to part of the contour of the measurement target surface. Reference symbols SP1, SP2, SP3, and SP4 denote the same measurement target surface SP, which are discriminated depending on the value of θz of a stage 110 and on the circumferences of which triangular marks B1, B2, B3, and B4 are shown, respectively. Reference symbol A denotes the range of one measurement operation of an interferometer 120, that is, the field of view of the interferometer 120.

If, for example, the interferometer 120 measures the measurement target surface SP1 in the positional relationship shown in FIG. 12, shape data E1 of the partial contour region is correspondingly obtained. Furthermore, if the interferometer 120 measures the measurement target surface SP2 (that is, the measurement target surface SP1 is rotated about a position OC by 90°, and is measured) in the positional relationship shown in FIG. 12, shape data E2 of the corresponding partial contour region is obtained. Similarly, if the interferometer 120 measures the measurement target surface SP3 (that is, the measurement target surface SP1 is rotated about the position OC by 240°, and is measured) in the positional relationship shown in FIG. 12, shape data E3 of the corresponding partial contour region is obtained. Furthermore, if the interferometer 120 measures the measurement target surface SP4 (that is, the measurement target surface SP1 is rotated about the position OC by 315°, and is measured) in the positional relationship shown in FIG. 12, shape data E4 of the corresponding partial contour region is obtained.

The shape data E1, E2, E3, and E4 are measured by rotating the measurement target surface SP1 about the position OC. To concatenate the shape data E1, E2, E3, and E4, therefore, it is necessary to rotate the shape data E1, E2, E3, and E4 about the position OC in the reverse direction. It is, however, impossible to specify the position OC on the data. To deal with this problem, in this embodiment, the position OC (that is, the position of the rotation axis about which the measurement target surface SP1 rotates as the stage 110 rotates) is obtained using the shape data E1, E2, E3, and E4 of the partial contour regions.

An arc included in the shape data E1 is contour data corresponding to part of the outer contour of the measurement target surface SP1, and based on its center, a position O1 of the center of the measurement target surface SP1 is obtained. An arc included in the shape data E2 is contour data corresponding to part of the outer contour of the measurement target surface SP2, and based on its center, a position O2 of the center of the measurement target surface SP2 is obtained. Similarly, an arc included in the shape data E3 is contour data corresponding to part of the outer contour of the measurement target surface SP3, and based on its center, a position O3 of the center of the measurement target surface SP3 is obtained. Furthermore, an arc included in the shape data E4 is contour data corresponding to part of the outer contour of the measurement target surface SP4, and based on its center, a position O4 of the center of the measurement target surface SP4 is obtained.

In this embodiment, a position where variation of the distances from the four positions O1, O2, O3, and O4 minimizes is obtained as the position of the rotation axis about which the measurement target surface SP rotates. More specifically, a position at equal distances from the positions O1, O2, O3, and O4 is obtained. Let O0 (x0, y0) be the coordinates of an appropriate position. Then, the distance from the coordinates O0 of the appropriate position to a position On (n=1 to 4) is represented by:

$$r_n = \sqrt{(x_n - y_0)^2 + (y_n - y_0)^2} \quad (5)$$

In equation (5), the position OC (xc, yc) is obtained by calibrating the position O0 (x0, y0) so that variation of distances r1 to r4 minimizes. In other words, the position O0 (x0, y0) which satisfies min(σ(rn)) need only be obtained.

The distance between the appropriate position O0 and the position On (n=1 to 4) is not always constant due to mechanical wobbling of the rotation axis or the like, and may vary. It is, therefore, possible to correct, as a mechanical error, an error with reference to an average of the distance between the appropriate position O0 and the position On (n=1 to 4).

Note that although the position OC is obtained using the shape data of four partial contour regions in this embodiment, the number of partial contour regions is not limited to four. For example, the position OC may be obtained using the shape data of all the partial contour regions or the shape data of some partial contour regions.

Assume that in this embodiment, a lateral magnification u of the shape data of the partial regions has been calibrated. Then, as in the first and second embodiments, the shape data of the plurality of partial regions are concatenated using the rotation angle of the stage 110 in positioning each partial region, and the lateral magnification u and the position OC of the rotation axis about which the measurement target surface SP rotates.

As described above, according to this embodiment, based on the shape data of partial contour regions each including part of the outer contour of the measurement target surface SP, it is possible to obtain, by relatively easy calculation, in a short time, the lateral magnification u and the position OC of the rotation axis about which the measurement target surface SP rotates. A measurement apparatus 1 can, therefore, correctly concatenate the shape data of the respective partial regions while calibrating the rotation axis and lateral magnification of the shape data of the partial regions without increasing the apparatus cost, thereby measuring the shape of the measurement target surface SP with high accuracy.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-161364 filed on Jul. 22, 2011, which is hereby incorporated by reference herein in its entirety.

What is claimed is:

1. A measurement method that utilizes a measurement apparatus to measure a shape of a measurement target surface disposed on a stage and having a circular contour, the method comprising:
    a first step of obtaining shape data by causing the stage which holds the measurement target surface, to rotate the measurement target surface about a rotation axis, positioning each of a plurality of partial regions of the measurement target surface in a field of view of the measurement apparatus, and causing the measurement apparatus to measure each of the plurality of partial regions;
    a second step of obtaining, for each of a plurality of partial contour regions of the plurality of partial regions, which includes part of a contour of the measurement target surface, a central position of the measurement target surface using data of the contour included in the shape data;
    a third step of obtaining, based on the plurality of central positions obtained for the plurality of partial contour regions, a position of the rotation axis of the measurement target surface in positioning each of the plurality of partial regions; and
    a fourth step of obtaining the shape of the measurement target surface by concatenating the shape data of the plurality of partial regions using the position of the rotation axis obtained in the third step and a rotation angle of the measurement target surface by the stage in positioning each of the plurality of partial regions.

2. The method according to claim 1, wherein
    the plurality of partial contour regions include at least three partial contour regions which are equiangularly positioned from a center of the measurement target surface, and
    in the third step, a position at equal distances from at least three central positions obtained for the at least three partial contour regions is obtained as the position of the rotation axis.

3. The method according to claim 1, wherein
    the plurality of partial contour regions include at least three partial contour regions, and
    in the third step, a circle having, on a circumference thereof, at least three central positions obtained for the at least three partial contour regions, is specified, and a central position of the circle is obtained as the position of the rotation axis.

4. The method according to claim 1, wherein
    the plurality of partial contour regions include at least four partial contour regions, and
    in the third step, a position where variation of distances from at least four central positions obtained for the at least four partial contour regions minimizes is obtained as the position of the rotation axis.

5. The method according to claim 1, further comprising
    a fifth step of obtaining a ratio between a radius of the measurement target surface and a distance between part of the contour and each of the plurality of central positions which has been obtained for each of the plurality of partial contour regions,
    wherein in the fourth step, the shape of the measurement target surface is obtained by concatenating the shape data of the plurality of partial regions also using the ratio.

6. The method according to claim 1, wherein in the fourth step, the shape of the measurement target surface is obtained by concatenating the shape data of the plurality of partial regions while performing calibration so that the plurality of central positions obtained for the plurality of partial contour regions coincide with each other when rotating the shape data of each of the plurality of partial regions about the position of the rotation axis obtained in the third step.

7. A measurement apparatus which measures a shape of a measurement target surface having a circular contour, comprising:
    a stage configured to hold the measurement target surface;
    an obtaining unit configured to obtain shape data by causing the stage to rotate the measurement target surface about a rotation axis, positioning each of a plurality of partial regions of the measurement target surface, and measuring each of the plurality of partial regions; and
    a processing unit configured to calculate the shape of the measurement target surface based on the shape data of each of the plurality of partial regions,
    wherein the processing unit
    obtains, for each of a plurality of partial contour regions of the plurality of partial regions, which includes part of a contour of the measurement target surface, a central position of the measurement target surface using data of the contour included in the shape data,
    obtains, based on the plurality of central positions obtained for the plurality of partial contour regions, a position of the rotation axis of the measurement target surface in positioning each of the plurality of partial regions, and
    obtains the shape of the measurement target surface by concatenating the shape data of the plurality of partial regions using the position of the rotation axis obtained as the center of rotation of the measurement target surface and a rotation angle of the measurement target surface by the stage in positioning each of the plurality of partial regions.

8. A non-transitory computer-readable storage medium storing a program for causing a computer to execute a calculation method of calculating a shape of a measurement target surface having a circular contour, the method comprising:

a first step of obtaining shape data measured by causing a stage which holds the measurement target surface to rotate the measurement target surface about a rotation axis, positioning each of a plurality of partial regions of the measurement target surface in a field of view of a measurement apparatus, and causing the measurement apparatus to measure each of the plurality of partial regions, a second step of obtaining, for each of a plurality of partial contour regions of the plurality of partial regions, which includes part of a contour of the measurement target surface, a central position of the measurement target surface using data of the contour included in the shape data, a third step of obtaining, based on the plurality of central positions obtained for the plurality of partial contour regions, a position of the rotation axis of the measurement target surface in positioning each of the plurality of partial regions, and a fourth step of obtaining the shape of the measurement target surface by concatenating the shape data of the plurality of partial regions using the position of the rotation axis obtained in the third step and a rotation angle of the measurement target surface by the stage in positioning each of the plurality of partial regions.

9. An optical element fabrication method comprising steps of:

measuring a shape of a surface of an optical element using a measurement method according to claim 1; and processing the surface using measurement data of the shape of the surface.

* * * * *